US009760756B2

(12) United States Patent
Eustice et al.

(10) Patent No.: US 9,760,756 B2
(45) Date of Patent: Sep. 12, 2017

(54) VENUE IDENTIFICATION USING SENSOR FINGERPRINTS

(71) Applicant: ARO, Inc., Seattle, WA (US)

(72) Inventors: Kevin Francis Eustice, Seattle, WA (US); Michael Perkowitz, Seattle, WA (US)

(73) Assignee: ARO, Inc., Seattle, WA (US)

( * ) Notice: Subject to any disclaimer, the term of this patent is extended or adjusted under 35 U.S.C. 154(b) by 331 days.

(21) Appl. No.: 14/559,382

(22) Filed: Dec. 3, 2014

(65) Prior Publication Data

US 2015/0163461 A1    Jun. 11, 2015

Related U.S. Application Data

(60) Provisional application No. 61/912,473, filed on Dec. 5, 2013.

(51) Int. Cl.
*H04W 24/00* (2009.01)
*G06K 9/00* (2006.01)
*H04W 4/00* (2009.01)
*G06K 9/62* (2006.01)

(52) U.S. Cl.
CPC ..... *G06K 9/00087* (2013.01); *G06K 9/00006* (2013.01); *G06K 9/6288* (2013.01); *H04W 4/00* (2013.01)

(58) Field of Classification Search
CPC ....................................................... H04W 4/00
USPC ...................................... 455/456.3; 704/14.1
See application file for complete search history.

(56) References Cited

U.S. PATENT DOCUMENTS

| 6,542,824 | B1 | 4/2003 | Berstis |
| 7,421,155 | B2 | 9/2008 | King et al. |
| 9,161,175 | B1 | 10/2015 | Smith et al. |
| 2004/0192352 | A1 | 9/2004 | Vallstrom et al. |
| 2006/0029296 | A1 | 2/2006 | King et al. |
| 2006/0041828 | A1 | 2/2006 | King et al. |
| 2006/0050996 | A1 | 3/2006 | King et al. |
| 2006/0053097 | A1 | 3/2006 | King et al. |
| 2006/0217990 | A1 | 9/2006 | Theimer et al. |

(Continued)

OTHER PUBLICATIONS

United States Office Action, U.S. Appl. No. 13/950,169, Jun. 12, 2014, eight pages.

(Continued)

*Primary Examiner* — Charles Shedrick
(74) *Attorney, Agent, or Firm* — Fenwick & West LLP

(57) ABSTRACT

When a mobile device is known to be at a venue, readings from one or more sensors of the device are used to generate a sensor fingerprint of the venue and/or a venue category corresponding to the venue. The sensor fingerprint indicates typical sensor readings for the one or more physical sensors for devices that are located at the venue and/or venues of the same category. Sensor fingerprints can also be generated for other circumstances associated with the mobile device, such as the activity being undertaken by the corresponding user and a type of event currently occurring at the venue. Fingerprints can also be generated for combinations of circumstances, such as a particular activity at a certain category of venue. When location data cannot distinguish at which venue a mobile device is located, sensor fingerprints are compared to sensor readings received from the device to resolve this ambiguity.

18 Claims, 4 Drawing Sheets

(56) References Cited

U.S. PATENT DOCUMENTS

| | | |
|---|---|---|
| 2007/0006098 A1 | 1/2007 | Krumm et al. |
| 2009/0005987 A1 | 1/2009 | Vengroff et al. |
| 2010/0127836 A1 | 5/2010 | Huang et al. |
| 2010/0127926 A1 | 5/2010 | Wang |
| 2010/0159951 A1* | 6/2010 | Shkedi ............... H04W 4/023 455/456.1 |
| 2011/0082642 A1 | 4/2011 | Magnussen |
| 2011/0300875 A1 | 12/2011 | Kim et al. |
| 2012/0191512 A1* | 7/2012 | Wuoti ............... G06Q 30/0207 705/14.1 |
| 2012/0268249 A1 | 10/2012 | Kansal et al. |
| 2012/0316774 A1 | 12/2012 | Yariv et al. |
| 2013/0124081 A1 | 5/2013 | Khosravy et al. |
| 2014/0019247 A1 | 1/2014 | Melanson |
| 2014/0032208 A1 | 1/2014 | Liu et al. |
| 2014/0032358 A1 | 1/2014 | Perkowitz et al. |
| 2014/0032453 A1 | 1/2014 | Eustice et al. |
| 2014/0032572 A1 | 1/2014 | Eustice et al. |
| 2014/0107918 A1* | 4/2014 | Friedler ............... G01C 21/20 701/445 |
| 2014/0141796 A1* | 5/2014 | Marti ............... G01S 5/0252 455/456.1 |
| 2014/0141803 A1* | 5/2014 | Marti ............... H04W 4/043 455/456.2 |
| 2014/0156180 A1* | 6/2014 | Marti ............... G01S 5/0252 701/423 |
| 2014/0171118 A1* | 6/2014 | Marti ............... G01S 5/0252 455/456.3 |
| 2014/0213299 A1* | 7/2014 | Marti ............... G06F 3/048 455/456.3 |
| 2014/0244156 A1 | 8/2014 | Magnusson et al. |
| 2014/0278054 A1* | 9/2014 | Tidd ............... G01C 21/00 701/409 |
| 2015/0052231 A1* | 2/2015 | Sun ............... H04L 41/0803 709/223 |
| 2015/0127239 A1 | 5/2015 | Breed et al. |
| 2015/0330793 A1 | 11/2015 | Zalewski et al. |
| 2016/0192154 A1 | 6/2016 | Modica et al. |

OTHER PUBLICATIONS

United States Office Action, U.S. Appl. No. 13/950,169, Feb. 27, 2014, eight pages.

* cited by examiner

VENUE IDENTIFICATION USING SENSOR FINGERPRINTS

CROSS-REFERENCE TO RELATED APPLICATION

This application claims the benefit of U.S. Provisional Application No. 61/912,473, filed Dec. 5, 2013, which is hereby incorporated by reference in its entirety.

BACKGROUND

1. Technical Field

The described embodiments pertain to using data collected by mobile sensors to assist in venue identification and classification.

2. Description of Related Art

Many modern user devices such as smartphones and tablets include a large number of sensors capable of collecting a wide array of data of varying types. A typical smartphone includes a GPS positioning sensor, a microphone, two or more cameras, and an accelerometer. Some user devices contain additional sensors, such as thermometers, barometers, altimeters, and the like.

A variety of applications and systems currently exist that make use of location data collected from a user device to provide location-aware functionality. Location-awareness is of value to a wide range of systems. Location-aware systems typically identify the user's current geo-spatial location using a location-determination sensor and compare this location to a database to predict a venue or area that the user is currently at or near. For example, a weather application can provide pertinent information about the city the user is currently in, a navigation system can offer to provide directions to near-by venues that the user has previously visited, a marketing system can provide advertisements for venues similar to those the user frequents, and the like. However, the value of such location-aware systems is limited by a number of factors.

First, in many environments, the difference in position of neighboring venues is too small for typical positioning sensors to unambiguously distinguish between them. Such sensors typically provide a geo-spatial location for a device with an accuracy of 5-20 yards, which is of the same order as the distance between venues in many environments. For example, the information pertinent to a user while sitting in her office may be significantly different to the information she would be interested in while in the bar next door after work, and the device's sensors may be functionally unable to differentiate between the two. As another example, the information relevant to a user who frequents a clothing store in a mall may be significantly different from the information desired by a user who frequents the music store directly above it; these two locations may appear identical to the device's location sensors.

Second, location-aware systems can only provide information pertinent to a particular venue if the systems already have access to data about the venue. For example, users in a music store may wish to be informed about new album releases and provided with reviews of those albums. However, the system needs to know in advance (e.g., via access to a venues database) that a music store exists at that location.

Third, existing systems consider where a user is, but the information that the user is interested in varies due to many factors other than location. For example, a user who is in a bar during karaoke night may be interested in very different information to a user who is there during the Super Bowl.

SUMMARY

The above and other problems are solved by a method, non-transitory computer readable storage medium, and system that use sensor fingerprints to assist in the identification of a venue at which a user is located. A sensor fingerprint (or "fingerprint") comprises a set of sensor readings from one or more of a user device's physical sensors (e.g., a microphone, a camera, a thermometer) that quantify physical properties of the environment around the mobile device. These sensor readings may be used to identify a particular set of circumstances around the user device, such as the user device being located at a particular venue or category of venue, the user device being carried by an individual undertaking a particular activity, or the user device being located at a particular type of event (e.g., a rock concert, a sports event). The sensor readings collected by the physical sensors may be aggregated to generate fingerprints with varying degrees of specificity. For example, the fingerprints may include a fingerprint that generically describes bars, a fingerprint that generically describes karaoke, and a fingerprint that describes a particular bar on karaoke night. A sensor fingerprint may be generated based on an aggregate or summary of multiple readings from a single user or from multiple users over time.

Sensor fingerprints include venue fingerprints, which indicate typical sensor readings expected at a venue. The venue fingerprint can be generated based on sensor readings gathered by the user's device during a previous visit to the venue and/or sensor readings gathered by other devices while located within the venue. Sensor fingerprints may also include venue category fingerprints, which indicate typical sensor readings expected at a category of venues. For example, by aggregating sensor readings from visits by multiple people to multiple coffee shops at multiple times, a "typical coffee shop" fingerprint can be built to assist in the identification of coffee shops not previously known to the system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention use sensor readings from one or more user devices to generate sensor fingerprints for venues and categories of venues. These fingerprints are compared to current sensor readings collected by a user device to determine which of a plurality of candidate venues the user device is currently located within. Sensor fingerprints can also be used to categorize new venues that were not previously known to the system.

System Overview

Figure 1:
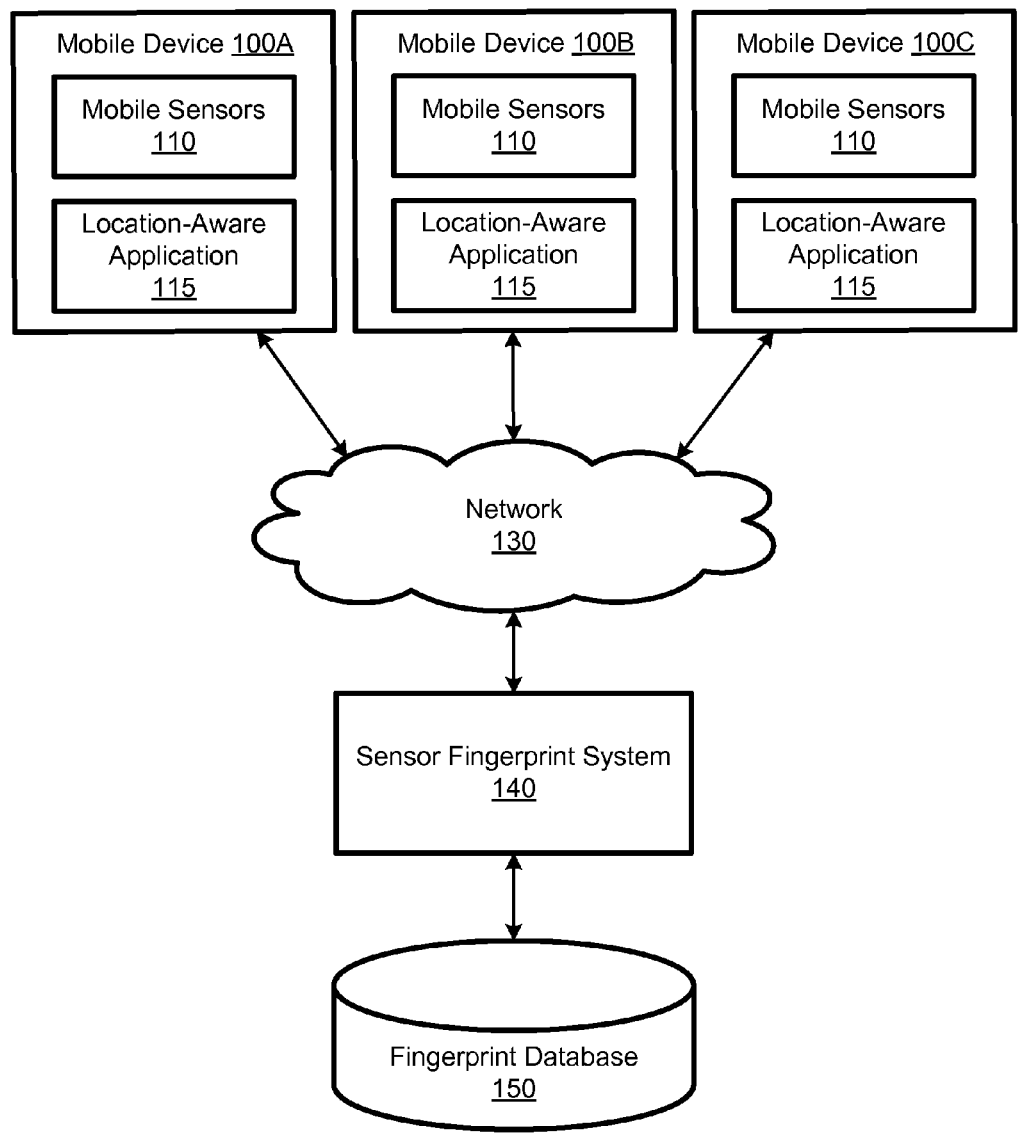
FIG. 1 is a high-level block diagram illustrating a system environment that uses sensor fingerprints to assist in the identification of a venue, according to one embodiment.

FIG. 1 illustrates a system environment that uses sensor fingerprints to assist in the identification of a venue, according to one embodiment. The system environment includes one or more mobile devices 100 (of which three are shown for illustrative purposes) connected to a sensor fingerprint system 140 via a network 130, and fingerprint database 150. In one embodiment, the sensor fingerprint system 140 and the fingerprint database 150 are contained on a single processing node, such as a server operated by a sensor fingerprinting service provider. In other embodiments, these entities may be provided individually at each of the mobile devices 100 or divided between the mobile devices and a centralized processing node. An example distributed embodiment is one where the sensor fingerprint system 140 is located on the mobile devices 100 and sensor fingerprints are stored in a centralized fingerprint database 150 to enable efficient sharing of fingerprints between user devices.

The mobile devices 100 are electronic devices that users will typically carry on their person, such as smartphones, tablets, PDAs, laptops, and the like. Three mobile devices 100A, 100B, and 100C are shown in FIG. 1 as an example only. In actual systems, many (e.g., thousands, or even millions of) mobile devices 100 may be connected to the sensor fingerprint system 140, via network 130. In the embodiment shown in FIG. 1, each mobile device 100 includes one or more mobile sensors 110 and at least one location-aware application 115. The location-aware application 115 provides functionality to the user based on the venue at which the user is located, such as a contextual information provider app running on a smartphone. The mobile sensors 110 are components of the mobile device 100 capable of taking measurements of a variable relating to the mobile device. The mobile sensors 110 include sensors to produce location data and physical sensors that quantify physical properties of the environment around the mobile device 100. The measurements taken by physical sensors for the purpose of venue fingerprinting are collectively referred to herein as sensor readings. The mobile sensors 110 provided in one embodiment are described in greater detail below, with reference to FIG. 2.

In the embodiment shown in FIG. 1, the mobile devices 100 are connected to a sensor fingerprint system 140 via a network 130. The network 130 is typically the Internet, but can be any network, including but not limited to any combination of a LAN (local-area network), a WAN (wide-area network), a mobile, a wired or wireless network, a private network, or a virtual private network.

The sensor fingerprint system 140 processes sensor readings collected by physical sensors of one or more mobile devices 100 to produce sensor fingerprints for venues and/or venue categories. The functionality attributed to the sensor fingerprint system 140 herein may be provided locally at the mobile devices 100, by a remote computing device (as shown in FIG. 1), or distributed between the two. Various embodiments of the sensor fingerprint system 140 are described below, with reference to FIG. 3.

The fingerprint database 150 comprises one or more computer-readable storage media and receives the fingerprints formed by the sensor fingerprint system 140 for storage. The fingerprints are stored in association with an identifier of the corresponding venue and/or venue category. Thus, over time the fingerprint database 150 builds a collection of sensor fingerprints describing multiple venues and venue categories. The sensor fingerprint system 140 can then access the stored fingerprints in order to assist in the identification of the venue at which a mobile device 100 is currently located. In one embodiment, the fingerprint database 150 is part of computer that also includes the sensor fingerprint system 140 (e.g., a server that provides sensor fingerprinting services to mobile devices 100). In another embodiment, such as when the sensor fingerprint system 140 functionality is provided locally at each mobile device 100, the fingerprint database 150 is provided by one or more computing devices that are accessed via the network 130 (e.g., as part of a server farm). In yet another embodiment, the fingerprint database 150 is provided at the mobile devices 100 individually. For example, a mobile device considers sensor readings from its own sensors, thereby providing sensor fingerprinting functionality without network connectivity.

Example Sensors

Figure 2:
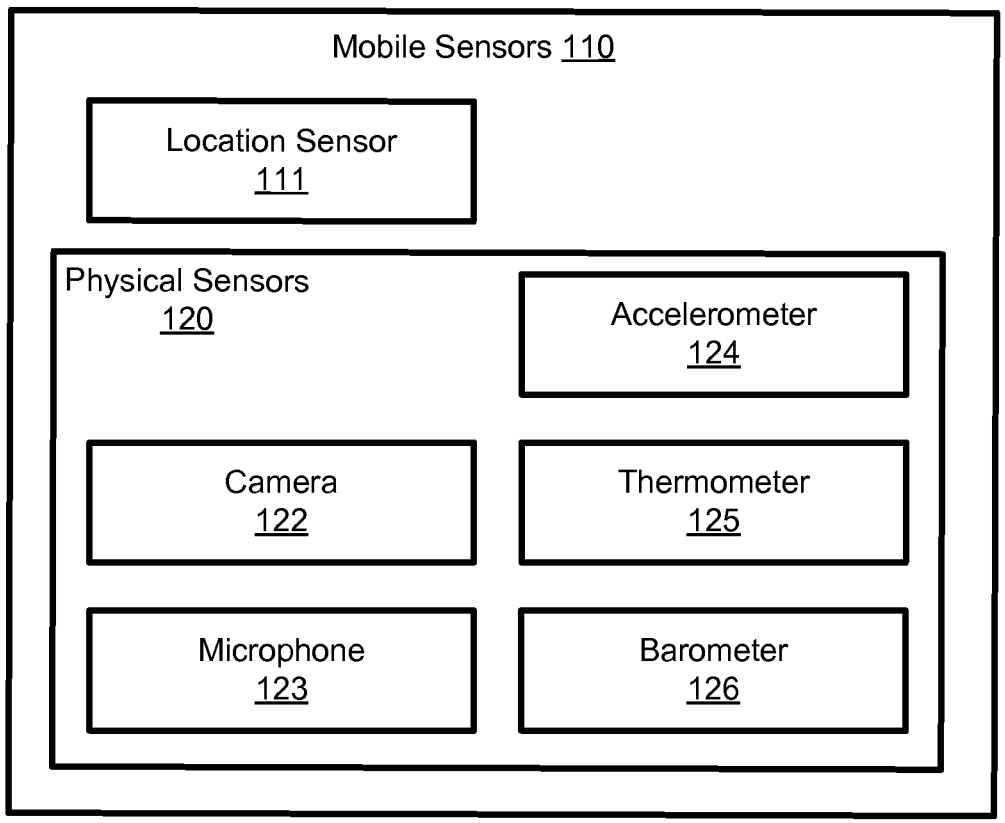
FIG. 2 is a high-level block diagram illustrating the mobile sensors of one of the user devices shown in FIG. 1, according to one embodiment.

FIG. 2 illustrates the mobile sensors 110 included in one embodiment of a user device 100. In the embodiment shown, the mobile sensors 110 include a location sensor 111 and physical sensors 120 including a camera 122, a microphone 123, an accelerometer 124, a thermometer 125, and a barometer 126. In other embodiments, different and/or additional mobile sensors 110 are included a part of the user device 100.

The location sensor 111 determines the geo-spatial location of the user device 100 using one or more techniques, including GPS tracking, WiFi location, cell-tower triangulation, and the like.

The camera 122 collects images (and/or video), which may be analyzed to determine environmental data such as an average light intensity level and/or an average spectral profile of the images. In one embodiment, a light of the mobile device 100 emits light with known properties at the time the camera 122 collects sensor readings. For example, the light may emit one or more known colors of light with preset intensities such that the image taken by the camera identifies the response of the environment to that color and intensity of light (e.g., red walls will not reflect blue light, but will reflect red light).

The microphone 123 collects audio data, which may be analyzed to determine environmental data such as an average sound intensity level and/or an average frequency profile of the audio data. In one embodiment, a speaker of the mobile device 100 emits a sound with known properties (e.g., a chirp with a predetermined frequency profile, volume, and length) at the time the microphone 123 collects sensor readings. Thus, the microphone 123 data can be used to determine features of the mobile device's environment, for example by using echo location techniques and/or examining the frequency profile of the space (e.g., an echo of the emitted sound from a concrete wall will be very different from the frequency profile of an echo of the same sound from a curtain).

The accelerometer 124 collects data regarding changes in velocity of the mobile device 100, which can be analyzed to determine additional data, such as what activity the user is performing (e.g., standing still, walking, running, dancing). Similarly, gyroscopes may provide further data indicative of a user's activities.

The thermometer 125 measures the temperature of the immediate surroundings of the user device 100. Different venues have different characteristic temperatures due to different climate control settings and exposure to the outdoors. Additionally, variability in temperature data may differentiate different venues. For example, a rooftop patio experiences a greater range of temperatures than a basement location. Some venues may have temporal patterns associated with temperature data. For example, a room with west-facing windows experiences an increase in temperature in the late afternoon while a room with east-facing windows experiences an increase in temperature in the morning.

The barometer 126 measures air pressure around the user device. Absolute pressure sensed by the barometer 126 may indicate an elevation of a venue, which can be used to distinguish between venues on different floors of a building. Even when the barometer 126 is not calibrated to provide precise elevation data, analysis of changes in barometric pressure over relatively short time spans may indicate when the barometer 126 (and hence the mobile device 100) are raised or lowered by one or more floors.

Sensor Fingerprint System

Figure 3:
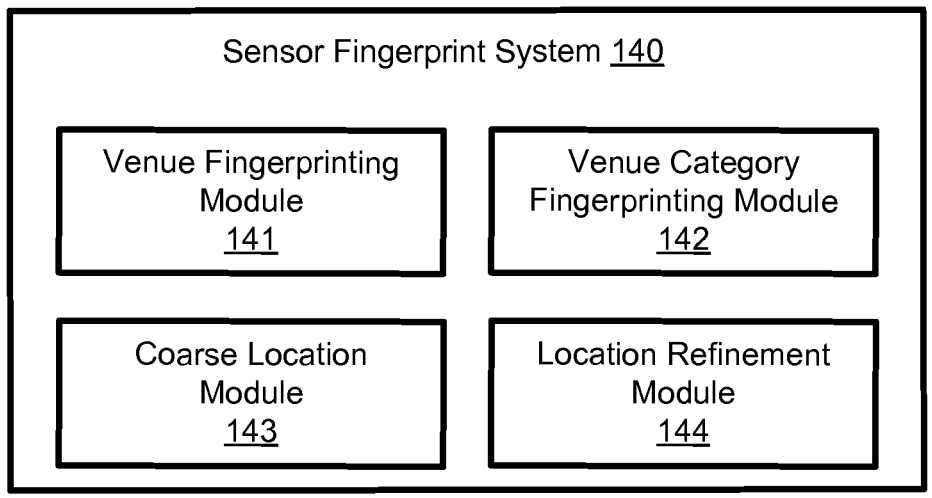
FIG. 3 is a high-level block diagram illustrating the sensor fingerprint system shown in FIG. 1, according to one embodiment.

FIG. 3 illustrates one embodiment of the sensor fingerprint system 140 shown in FIG. 1. In the illustrated embodiment, the sensor fingerprint system 140 includes a venue fingerprinting module 141, a venue category fingerprinting module 142, a coarse location module 143, and a location refinement module 144. In other embodiments, the sensor fingerprint system 140 contains different and/or additional elements. In addition, the functions may be distributed among the elements in a different manner than described herein.

The venue fingerprinting module 141 receives sensor readings from one or more mobile devices 100 that are known to have been located within a particular venue (e.g., the corresponding users checked in or confirmed their presence at the venue) at the time the sensor reading was collected. The venue fingerprinting module 141 processes the sensor readings to produce a venue fingerprint that identifies typical sensor readings for the venue for one or more sensor reading types. In various embodiments, a sensor fingerprint includes information describing measures of sensor reading variability (e.g., standard deviation, range). The sensor fingerprint may include time-specific typical sensor readings (and measures of sensor reading variability) or device-specific typical sensor readings (and measures of sensor reading variability). For example, the frequency profile of a sound sample collected at a bar on a Tuesday afternoon is likely to be significantly different from a sound sample collected in the same bar on a Saturday night during karaoke. As another example, the frequency response of a microphone 123 varies depending on the manufacturer of the mobile device 100 and/or microphone 123. Thus, the frequency profile obtained by recording the same sound with each device will be different.

In one embodiment, variations between devices are tested in controlled conditions and a filter is applied to sensor readings to correct for the differences. For example, by recording samples of white noise using a mobile device 100, the exact frequency response of the microphone 123 of that device can be determined, and a filter applied to samples recorded in future to provide an estimate of the true frequency profile of the sound received at the device. In this way, recordings can be normalized across devices.

In other embodiments, these known variations can be accounted for either by including multiple sets of values within a fingerprint with an indication of what conditions (e.g., time, device) each corresponds to, by having a different fingerprint for each variation, with the fingerprint that is used being selected based on the relevant conditions, or by having a time-specific sensor fingerprint generated from fingerprint readings collected during a recurring time period. For example, if the current time is a Wednesday afternoon, a "weekday: daytime" fingerprint might be used, whereas on a Friday night, a "weekend: night" fingerprint might be used. The creation of a venue fingerprint is described in greater detail below, with reference to FIG. 4.

The venue category fingerprinting module 142 receives sensor readings from one or more mobile devices 100 that are known to have been located within a venue of a particular category (e.g., coffee shops, libraries, sports stadiums) at the time the sensor readings were collected. These sensor readings may also be used by the venue fingerprinting module 141 to generate fingerprints for the individual venues within the categories, depending on the specific embodiment. The venue category fingerprinting module 142 processes the sensor readings to generate a category venue fingerprint, which is an aggregate fingerprint for the venue category that identifies typical sensor readings obtained by one or more sensor types in venues of that category. As with fingerprints for specific venues, venue category fingerprints can account for known differences, such as temporal variations and device-specific variations. The creation of a venue category fingerprint is described in greater detail below, with reference to FIG. 5.

The coarse location module 143 receives data from one or more location sensors 111 of a mobile device 100 and determines a geo-spatial location of the mobile device. Typically the geo-location will have a degree of precision, based on the accuracy of the location sensors 111 used to determine it. The coarse location module 143 may determine the geo-spatial location based on a single sensor reading, or aggregate multiple sensor readings (e.g., by finding an average of multiple GPS readings) to provide an estimate of the mobile device's location. In one embodiment, the coarse location module 143 compares the determined geo-spatial location to a venues database (not shown) to identify one or more venues at which the mobile device 100 may be located.

The location refinement module 144 uses sensor fingerprints to refine the location for a mobile device 100 from the coarse location determined by the coarse location module 143. The location refinement module 144 compares readings from the physical sensors 120 to fingerprints in the fingerprint database 150 to determine a venue and/or venue category at which the mobile device 100 is likely to be located. The location refinement module 140 may also determine additional information about the venue from the fingerprints, such as what activity the user is participating in (e.g., watching or participating in a sporting event), whether the venue is open (e.g., whether the user is a bartender setting up before opening, or a patron who is drinking), and the like. The location refinement module 140 may also use other relevant data about venues, such as hours of operation or the likelihood of this user or users in general being at that venue at the current time, in order to refine the estimated likelihood for each venue.

In one embodiment, the location refinement module 144 selects the single most likely venue in the device's vicinity based on the sensor fingerprints. In another embodiment, the location refinement module 144 filters candidate venues (e.g., all those within one hundred yards of the determined coarse location) to produce a list of candidate venues for further processing (e.g., for presentation to the user, who selects the correct venue from the list). In a further embodiment, a single venue is selected if one can be identified with greater than a threshold level of certainty, and the user is presented with a list of candidate venues (e.g., all those with at least a predetermined minimum level of certainty) to choose from if no single venue exceeds the threshold. Methods of using venue fingerprints and venue category fingerprints are described in further detail below, with reference to FIGS. 6 and 7 respectively.

In some embodiments, the location refinement module 144 may be able to identify the current venue at which a mobile device 100 is located without receiving location data at all. For example, if a user enters a recording studio that has a distinctive fingerprint (e.g., lime green walls and a distinctive acoustic profile), then the readings obtained from the physical sensors 120 may be matched to the studio's fingerprint with a high enough degree of certainty that the location data need not be considered at all.

Sensor Fingerprint Generation

Figure 4:
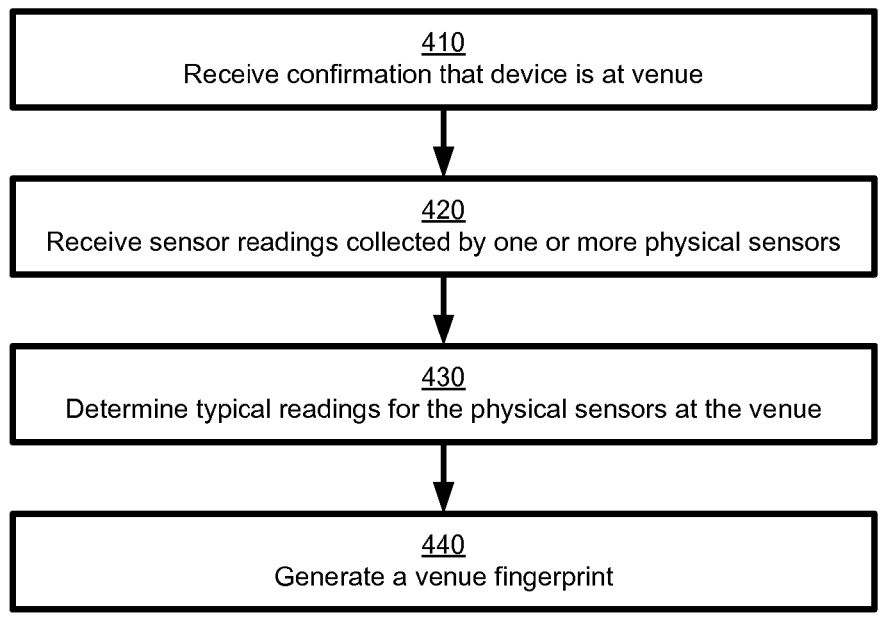
FIG. 4 is a flow chart illustrating a method of generating a venue fingerprint, according to one embodiment.

FIG. 4 illustrates a method of generating a fingerprint for a venue, according to one embodiment. The steps of FIG. 4 are illustrated from the perspective of the various elements of the sensor fingerprint system 140 performing the method. However, some or all of the steps may be performed by other entities and/or components. In addition, some embodiments may perform the steps in parallel, perform the steps in different orders, or perform different steps.

In the embodiment illustrated in FIG. 4, the method begins at 410 with the sensor fingerprint system 140 receiving confirmation that a mobile device 100 is at a particular venue. For example, if the user checks in at a venue on the mobile device 100, confirms a venue prediction generated by the coarse location module 143, or the coarse location module provides sufficient location resolution to unambiguously indicate only a single candidate venue, it is reasonable to infer that the device is in fact at the venue. Other methods of confirming that the mobile device 100 is at a particular venue may be used.

In step 420, the sensor fingerprint system receives readings from the physical sensors 120 of the mobile device 100. Typically, the mobile device 100 will gather readings from all available physical sensors 120, but in some instances, the sensor fingerprint system 140 may request readings from a subset of the available sensors. For example, if the mobile device 100 contains a thermometer 125 but the particular instance of the sensor fingerprint system 140 is not configured to process temperature data, readings from the thermometer may not be provided. Alternatively or additionally, the sensor fingerprint system does not process readings from physical sensors 120 that the system is not configured to use. In one embodiment, each physical sensor 120 provides multiple readings to reduce the likelihood of outliers (e.g., a light level reading taken by a camera 122 in a normally dark bar taken at the exact moment another patron takes a photograph using a flash) significantly affecting the fingerprint.

In step 430, the venue fingerprinting module 141 determines values of typical sensor readings for each physical sensor 120 based on the received readings. If the venue fingerprinting module 141 is creating a new sensor fingerprint for a venue (e.g., a venue without a sensor fingerprint), it takes the average of the readings received from each physical sensor 120 to determine the corresponding typical sensor reading for that sensor. In one embodiment, values that differ from the typical sensor reading by more than a predetermined amount are discarded as erroneous.

Alternatively or additionally, if there is already a fingerprint in the fingerprint database 150 (and the venue fingerprinting module 141 is configured to update existing fingerprints, rather than create new ones), the venue fingerprinting module determines a typical sensor reading for each sensor reading type by finding the average of the existing typical sensor reading in the fingerprint and the received readings from the corresponding physical sensor 120. The typical sensor reading may also include a measure of sensor reading variability (e.g., standard deviation, range) associated with the typical sensor reading. In one embodiment, a count of how many readings have contributed to each typical sensor reading in a fingerprint is stored, and the contribution of the new readings is weighted such that all readings that have contributed to the average have equal weight. For example, if an existing typical sensor reading was determined from nine readings, and during the update process a single new reading is received, the new reading will be weighted such that it contributes ten percent of the average, while the existing readings account for the other ninety percent. In another embodiment, new readings are weighted more heavily than older ones so that if a venue's properties (and hence fingerprint) change, these changes will be accurately reflected in the stored fingerprint more quickly.

In step 440, the venue fingerprinting module 141 generates the venue fingerprint using the determined typical sensor readings for each physical sensor 120 and stores the fingerprint in the fingerprint database 150. In one embodiment, the stored fingerprint is a file comprising an indicator of sensor reading types used along with the typical sensor readings of those sensors and a count value indicating how many readings contributed to each typical sensor reading. As well as assisting with the weighting of the contribution of newly received readings, the count also provides an indication of how accurate the fingerprint is. In general, typical sensor readings determined from a greater number of readings will be considered more reliable than those determined from a small number of readings.

Figure 5:
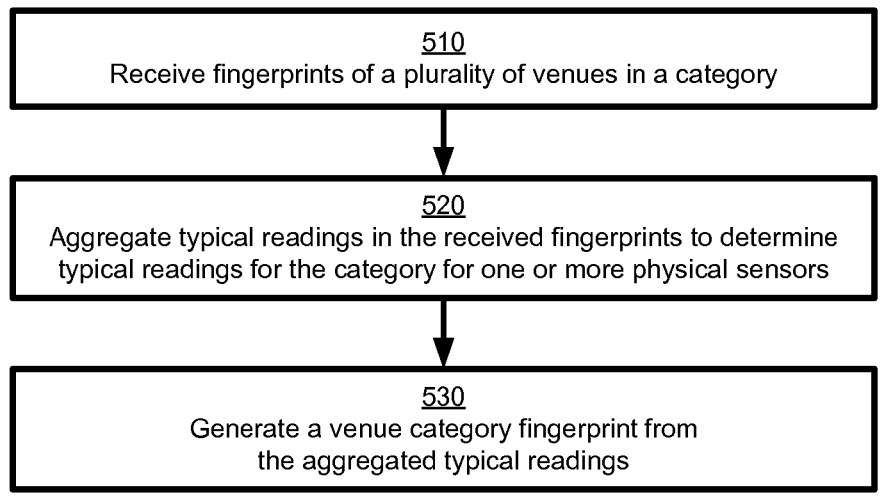
FIG. 5 is a flow chart illustrating a method of generating a venue category fingerprint, according to one embodiment.

FIG. 5 illustrates a method of generating a venue category fingerprint, according to one embodiment. The steps of FIG. 5 are illustrated from the perspective of the various elements of the sensor fingerprint system 140 performing the method. However, some or all of the steps may be performed by other entities and/or components. In addition, some embodiments may perform the steps in parallel, perform the steps in different orders, or perform different steps.

In the embodiment illustrated in FIG. 5, the method begins at 510 with the venue category fingerprinting module 142 receiving the fingerprints of a plurality of venues that are in a given category. A category may be very broad (e.g., all sports venues), very narrow (e.g., Chinese Restaurants in Williston, Vermont that have an "all you can eat" buffet), or anywhere in between. In one embodiment, users are provided with controls at their mobile devices 100 to specify what level of specificity they would like to use for categories, and in what way categories should be broadened/narrowed. In another embodiment, the level of specificity is chosen based on how similar the associated fingerprints are. A broad category that nevertheless contains many similar individual fingerprints can be recognizable from just sensor readings, while a narrower category that includes a wider range of individual fingerprints may need to be subdivided to accurately describe the venue.

At step 520, the venue category fingerprinting module 142 aggregates the typical sensor readings the physical sensor 120 that are included in the received fingerprints to determine a typical sensor reading for each sensor when a mobile device 100 is located within a venue of the corresponding category. As with the determination of typical sensor readings when creating a venue fingerprint, the typical sensor readings for a category type fingerprint can be found using various weightings of the typical sensor readings from the individual venue fingerprints.

At step 530, the venue category fingerprinting module 142 generates the venue category fingerprint using the determined typical sensor readings for each physical sensor 120 and stores the fingerprint in the fingerprint database 150. In one embodiment, the stored fingerprint is a file comprising an indicator of sensor reading types used along with the typical sensor readings of those sensors and a count value indicating how many readings contributed to each typical sensor reading.

In the embodiment illustrated in FIG. 5, the fingerprint for a category is generated from the fingerprints of the individual venues in that category. Alternatively or additionally, the fingerprint for a category is generated by aggregating all of the sensor readings for venues within that category, which are then processed as if they all came from the same venue. Thus, a venue category fingerprint can be viewed as a venue fingerprint for a single large venue made up of many geographically disparate portions (the individual venues in the category).

Venue Identification Using Sensor Fingerprints

Figure 6:
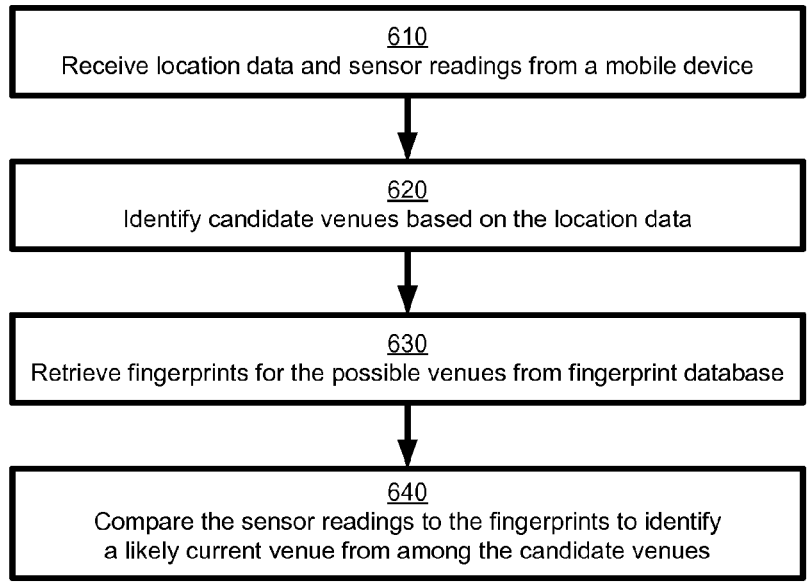
FIG. 6 is a flow chart illustrating a method of using a venue fingerprint to assist in determining a user's current venue, according to one embodiment.

FIG. 6 illustrates a method of using a venue fingerprint to assist in determining a user's current venue, according to one embodiment. The steps of FIG. 6 are illustrated from the perspective of the various elements of the sensor fingerprint system 140 performing the method. However, some or all of the steps may be performed by other entities and/or components. In addition, some embodiments may perform the steps in parallel, perform the steps in different orders, or perform different steps.

In the embodiment shown in FIG. 6, the method begins at 610 with the sensor fingerprinting system 140 receiving location data from the location sensor 111 and sensor readings from the physical sensors 120 of a mobile device 100. In one embodiment, the sensor fingerprinting system 140 is provided as a cloud service and receives the data from the sensors 110 via a network 130. In another embodiment, the sensor fingerprinting system 140 is stored on the mobile device 100 and receives the data directly from the local sensors 100.

At 620, the coarse location module 143 identifies a plurality of candidate venues based on the location data. In one embodiment, the location data is a set of GPS coordinates and the coarse location module 143 searches a venue database (not shown) for all venues within a predetermined distance (e.g., 50 yards) of the position indicated by the GPS coordinates. In other embodiments, other methods of specifying a location and identifying candidate venues in the vicinity of the identified location are used.

At 630, the location refinement module 144 retrieves fingerprints for the candidate venues from the fingerprint database 150. In one embodiment, if any of the candidate venues do not have a stored fingerprint, a null fingerprint is returned, and these venues are only considered if a good match for the sensor readings is not found among the venues that do have stored fingerprints. In another embodiment, if one (or more) of the candidate venues does not have its own stored fingerprint, the location refinement module 144 determines a category for the venue without a fingerprint and obtains a venue category fingerprint that generically describes that category from the fingerprint database 150. In general, venues that are known to be similar with regards to features such as category (e.g. sandwich shops), name (e.g. venues whose names contain "deli"), and clientele (visited by the same people or people with similar characteristics) can be presumed to have some likelihood of sharing sensor fingerprints. In the absence of other venue information, fingerprints from similar venues can improve the system's location estimates. A method for identifying a venue at which a mobile device 100 is located based on a venue category fingerprint is described in greater detail below, with reference to FIG. 7.

At 640, the location refinement module 144 compares the sensor readings to the fingerprints corresponding to the candidate venues to identify a likely current venue. The location refinement module 144 determines the degree to which each of the candidate venue fingerprints matches the sensor readings received from the physical sensors 120. For example, each fingerprint might be assigned a percentage score based on how closely it matches the sensor readings, with 100% indicating an exact match and 0% indicating no similarity at all, with all real-life readings falling somewhere between these two extremes. In one embodiment, the location refinement module 144 automatically selects the venue fingerprint that most closely matches the sensor readings. In another embodiment, any venue fingerprint that matches the sensor readings within a threshold tolerance is selected and further processing is performed (e.g., presenting the options to the user for manual selection) to identify the correct fingerprint. The location refinement module 144 may determine a subset of venue fingerprints having typical sensor readings within a threshold tolerance from the sensor data. The threshold tolerance may be independent of the sensor reading type (e.g., a percentage) or may depend on a measure of sensor reading variability associated with a typical sensor reading. The venue is selected from the venues associated with the subset of venue fingerprints. Note that it is possible that no fingerprints will match the sensor readings within the threshold tolerance. In this case, the user may be prompted to manually identify the current venue. Once the correct venue has been identified, it can be fingerprinted and passed to one or more location-aware applications 115 to provide location-specific functionality.

Figure 7:
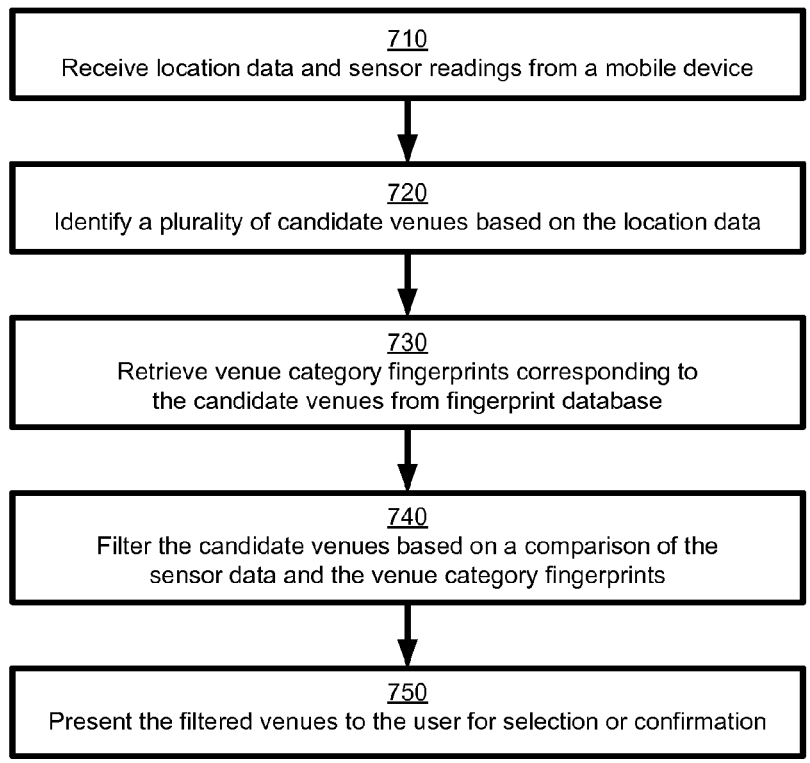
FIG. 7 is a flow chart illustrating a method of using a venue category fingerprint to assist in determining a user's current venue, according to one embodiment.

FIG. 7 illustrates a method of using a venue category fingerprint to assist in determining a user's current venue, according to one embodiment. The steps of FIG. 7 are illustrated from the perspective of the various elements of the sensor fingerprint system 140 performing the method. However, some or all of the steps may be performed by other entities and/or components. In addition, some embodiments may perform the steps in parallel, perform the steps in different orders, or perform different steps.

In the embodiment shown in FIG. 7, the method begins at 710 with the sensor fingerprinting system 140 receiving location data from the location sensor 111 and sensor readings from the physical sensors 120 of a mobile device 100, and proceeds to step 720 in which a plurality of candidate venues are identified based on the location data. These steps are performed in substantially the same manner as in the method for identifying a current venue using venue fingerprints described above with reference to FIG. 6.

At 730, the location refinement module 144 identifies a category for each of the candidate venues and retrieves corresponding venue category fingerprints from the fingerprint database 150. The categories of the candidate venues may be stored in the venue database and/or inferred from information that is available about the venues (e.g., the name of the venue, the results of an internet search for the location and/or name, and the like). In one embodiment, venue fingerprints are retrieved for any venues that have them, with category type fingerprints only being retrieved for those venues that do not have a venue fingerprint (or have a venue fingerprint generated from less than a threshold number of sensor readings). The location refinement module 144 may retrieve venue fingerprints generated by the user's mobile device 100 (e.g., stored locally at the mobile device) or fingerprints generated by any mobile device that meets pre-determined criteria (e.g., all devices, all devices by the same manufacturer as the user's device, all devices of the same model and the user's device). In another embodiment, when a venue is associated with less than a threshold number of fingerprint readings, a hybrid fingerprint may be generated for the venue. A venue category comprising the venue is identified and the venue category fingerprint associated with the identified category is retrieved. To generate the hybrid fingerprint, the venue's sensor readings are combined with typical values from the venue category fingerprint according to a weighted average. For example, the venue's sensor readings receive a higher weighting than the venue category fingerprints.

At 740, the location refinement module 144 filters the candidate venues by comparing the sensor readings to the venue category fingerprints. The location category refinement module 144 determines the degree to which each of the candidate venue fingerprints matches the sensor readings received from the physical sensors 120. For example, each fingerprint might be assigned a percentage score based on how closely it matches the sensor readings, with 100% indicating an exact match and 0% indicating no similarity at all, with real-life readings falling somewhere between these two extremes. In one embodiment, the location refinement module 144 automatically selects the venue category that most closely matches the sensor readings. Note that this does not necessarily unambiguously define the current venue at which the mobile device 100 is located. For example, if there are two restaurants located next door to each other, a determination that the device is in a restaurant does not fully resolve the ambiguity in location, although it may narrow down the possibilities (e.g., by confirming that the device is not out on the street, or in a movie theatre across the street). In another embodiment, any venue category that matches the sensor readings within a predetermined tolerance is selected.

At 750, the candidate venues that passed the filtering performed in step 740 are presented to the user so that the user can select the current venue. If only a single venue passes the filter, then this step may be skipped with the remaining venue being automatically selected, or the remaining venue may be presented to the user for confirmation. If no venues pass the filtering step, then the user may be prompted to manually identify the current venue. Once the correct venue has been identified, it can be fingerprinted and passed to one or more location-aware applications 115 to provide location-specific functionality.

The systems and methods described above provide several advantages to location-aware applications 115 over the use of location sensors 111 alone. When the data collected by a location sensor 111 of a mobile device 100 is not adequate to determine at which of a plurality of venues the device is, sensor fingerprints can be used resolve this ambiguity. In addition, readings from various sensors can be used to infer information about the type of venue at which the device is and what activity the user is undertaking, even in the absence of location data. Further, sensor fingerprints can be used to assign features (e.g., venue category) to previously unknown venues that the user visits.

Additional Configuration Considerations

A computer is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on a storage device, loaded into memory, and executed by a processor.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any other type of computer-readable storage medium suitable for storing electronic instructions, and coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope of the invention.

What is claimed is:

1. A method for determining a venue of a mobile device, the method comprising:
    receiving location data describing a geographical location of a mobile device, a sensor reading collected by a physical sensor of the mobile device, the sensor reading quantifying a physical property of an environment around the mobile device, and a collection time at which the sensor reading was collected by the physical sensor;
    identifying candidate venues based on the location data, the candidate venues located within a threshold distance of the geographical location;
    retrieving, from a fingerprint database, sensor fingerprints corresponding to the candidate venues, a sensor fingerprint comprising typical sensor readings from the physical sensor at a corresponding candidate venue, the sensor fingerprints including a time-specific sensor fingerprint comprising typical sensor readings from the physical sensor at the corresponding candidate venue during a recurring time period that includes the collection time; and
    determining a venue of the mobile device by comparing the sensor reading to the typical sensor readings of the retrieved sensor fingerprints.

2. The method of claim 1, wherein determining the venue of the mobile device comprises:
    determining scores indicating degrees to which the sensor reading matches the typical sensor readings of the sensor fingerprints;
    selecting a sensor fingerprint from the retrieved sensor fingerprints based on the determined scores; and
    determining the venue of the mobile device from a candidate venue corresponding to the selected sensor fingerprint.

3. The method of claim 1, wherein determining the venue of the mobile device comprises:
    determining whether the sensor reading is within a threshold tolerance from a typical sensor reading of a candidate sensor fingerprint of the retrieved sensor fingerprints; and
    responsive to determining that the sensor reading is within the threshold tolerance from the typical sensor reading, determining the venue of the mobile device from a candidate venue corresponding to the candidate fingerprint.

4. The method of claim 3, wherein determining whether the sensor reading is within the threshold tolerance from the typical sensor reading comprises:
    obtaining, from the candidate sensor fingerprint, a measure of sensor reading variability specific to a sensor reading type of the sensor reading; and
    determining whether the sensor reading is within the measure of sensor reading variability from the typical sensor reading.

5. The method of claim 1, wherein retrieving sensor fingerprints comprises:
    for a candidate venue of the candidate venues, determining that the fingerprint database lacks a venue fingerprint comprising typical sensor readings for the physical sensor at the candidate venue;
    identifying a venue category of the candidate venue; and
    retrieving a venue category fingerprint generated by aggregating sensor readings collected at venues other than the candidate venue in the venue category.

6. The method of claim 1, wherein retrieving sensor fingerprints comprises:
    for a candidate venue of the candidate venues, determining that the fingerprint database comprises a venue fingerprint generated from fewer than a threshold number of typical sensor readings;
    identifying a venue category of the candidate venue;
    retrieving a venue category fingerprint generated by aggregating sensor readings collected at venues in the venue category including at least one venue other than the candidate venue; and
    generating a hybrid fingerprint comprising typical sensor readings determined from a weighted average of sensor readings collected at the candidate venue and typical sensor readings indicated by the venue category fingerprint.

7. The method of claim 1, wherein retrieving sensor fingerprints comprises:
    obtaining a device type of the mobile device; and
    retrieving a device-specific sensor fingerprint generated from sensor readings taken at one of the candidate venues by mobile devices of the obtained device type.

8. The method of claim 1, wherein the physical sensor is selected from a group consisting of: a camera, a microphone, an accelerometer, a thermometer, and a barometer.

9. A system for determining a venue of a mobile device, the system comprising:
    a processor;
    a non-transitory, computer-readable medium comprising instructions executable by the processor, the instructions comprising instructions for:
        receiving location data describing a geographical location of a mobile device, a sensor reading collected by a physical sensor of the mobile device, the sensor reading quantifying a physical property of an environment around the mobile device, and a collection time at which the sensor reading was collected by the physical sensor;

identifying candidate venues based on the location data, the candidate venues located within a threshold distance of the geographical location;

retrieving, from a fingerprint database, sensor fingerprints corresponding to the candidate venues, a sensor fingerprint comprising typical sensor readings from the physical sensor at a corresponding candidate venue, the sensor fingerprints including a time-specific sensor fingerprint comprising typical sensor readings from the physical sensor at the corresponding candidate venue during a recurring time period that includes the collection time; and determining a venue of the mobile device by comparing the sensor reading to the typical sensor readings of the retrieved sensor fingerprints.

10. The system of claim 9, wherein determining the venue of the mobile device comprises:

determining scores indicating degrees to which the sensor reading matches the typical sensor readings of the sensor fingerprints;

selecting a sensor fingerprint from the retrieved sensor fingerprints based on the determined scores; and determining the venue of the mobile device from a candidate venue corresponding to the selected sensor fingerprint.

11. The system of claim 9, wherein determining the venue of the mobile device comprises:

determining whether the sensor reading is within a threshold tolerance from a typical sensor reading of a candidate sensor fingerprint of the retrieved sensor fingerprints; and responsive to determining that the sensor reading is within the threshold tolerance from the typical sensor reading, determining the venue of the mobile device from a candidate venue corresponding to the candidate fingerprint.

12. The system of claim 11, wherein determining whether the sensor reading is within the threshold tolerance from the typical sensor reading comprises:

obtaining, from the candidate sensor fingerprint, a measure of sensor reading variability specific to a sensor reading type of the sensor reading; and determining whether the sensor reading is within the measure of sensor reading variability from the typical sensor reading.

13. The system of claim 9, wherein retrieving sensor fingerprints comprises:

for a candidate venue of the candidate venues, determining that the fingerprint database lacks a venue fingerprint comprising typical sensor readings for the physical sensor at the candidate venue;

identifying a venue category of the candidate venue; and retrieving a venue category fingerprint generated by aggregating sensor readings collected at venues other than the candidate venue in the venue category.

14. The system of claim 9, wherein retrieving sensor fingerprints comprises:

for a candidate venue of the candidate venues, determining that the fingerprint database comprises a venue fingerprint generated from fewer than a threshold number of typical sensor readings;

identifying a venue category of the candidate venue;

retrieving a venue category fingerprint generated by aggregating sensor readings collected at venues in the venue category including at least one venue other than the candidate venue; and generating a hybrid fingerprint comprising typical sensor readings determined from a weighted average of sensor readings collected at the candidate venue and typical sensor readings indicated by the venue category fingerprint.

15. The system of claim 9, wherein retrieving sensor fingerprints comprises:

obtaining a device type of the mobile device; and retrieving a device-specific sensor fingerprint generated from sensor readings taken at one of the candidate venues by mobile devices of the obtained device type.

16. The system of claim 9, wherein the physical sensor is selected from a group consisting of: a camera, a microphone, an accelerometer, a thermometer, and a barometer.

17. A non-transitory, computer-readable medium comprising instructions executable by a processor, the instructions comprising instructions for:

receiving location data describing a geographical location of a mobile device, a sensor reading collected by a physical sensor of the mobile device, the sensor reading quantifying a physical property of an environment around the mobile device, and a collection time at which the sensor reading was collected by the physical sensor;

identifying candidate venues based on the location data, the candidate venues located within a threshold distance of the geographical location;

retrieving, from a fingerprint database, sensor fingerprints corresponding to the candidate venues, a sensor fingerprint comprising typical sensor readings from the physical sensor at a corresponding candidate venue, the sensor fingerprints including a time-specific sensor fingerprint comprising typical sensor readings from the physical sensor at the corresponding candidate venue during a recurring time period that includes the collection time; and determining a venue of the mobile device by comparing the sensor reading to the typical sensor readings of the retrieved sensor fingerprints.

18. The computer-readable medium of claim 17, wherein the physical sensor is selected from a group consisting of: a camera, a microphone, an accelerometer, a thermometer, and a barometer.

* * * * *